OSCILLATOR WITH AFC AND GATE-CONTROLLED DIRECT SYNCHRONIZATION

Filed Sept. 19, 1961 2 Sheets-Sheet 1

INVENTOR
WOUTER SMEULERS
BY Frank R. Jeifari
AGENT

OSCILLATOR WITH AFC AND GATE-CONTROLLED DIRECT SYNCHRONIZATION

Filed Sept. 19, 1961

INVENTOR
WOUTER SMEULERS
BY
Frank R. Jifani
AGENT

United States Patent Office 3,199,046

Patented Aug. 3, 1965

3,199,046

OSCILLATOR WITH AFC AND GATE-CONTROLLED DIRECT SYNCHRONIZATION

Wouter Smeulers, Emmasingel, Eindhoven, Netherlands, assignor to North American Philips Company, Inc., New York, N.Y., a corporation of Delaware Filed Sept. 19, 1961, Ser. No. 139,087
Claims priority, application Netherlands, Oct. 17, 1960, 256,943
12 Claims. (Cl. 331—10)

This invention relates to circuit arrangements for synchronizing a local oscillator with the aid of incoming pulsatory synchronizing signals. Such an arrangement comprises a circuit for maintaining the local oscillator in a state of synchronization with the aid of the synchronizing signal and a catching circuit for restoring the local oscillator to the state of synchronization with the aid of the said synchronizing signals when a state of non-synchronization has arisen.

Such circuit arrangements may be used in television receivers for synchronizing the raster oscillator or the line oscillator. They are described in U.S. Patent No. 3,070,-753 for synchronizing the raster oscillator and in the German patent specification No. 965,500 for synchronizing the line oscillator.

The aforementioned U.S. Patent No. 3,070,753 describes how the raster synchronizing pulses are separated from the incoming television signal and, after integration supplied for direct synchronization to the raster oscillator are gradually attenuated when the circuit arrangement is brought into a state of synchronization. Consequently, in the state of synchronization, raster synchronizing pulses of comparatively small amplitudes only are present which, in co-action with a raster phase discriminator, bring about the synchronization of the faster oscillator.

The attenuation is effected with the aid of a coincidence detector which, in a state of synchronization, provides a voltage which, after having been smoothed in a filter, may be applied as an attenuating voltage to the element transmitting the raster synchronizing pulses.

A disadvantage of the above circuit is, however, that the smoothing filter has a tendency to retain the voltage produced, so that it takes some time before the attenuating voltage has disappeared when the raster oscillator leaves the state of synchronization.

From this it follows that the rastor synchronizing pulses are attenuated to a greater or lesser extent up to the moment when the attenuating voltage has disappeared, so that it takes some time before said pulses have assumed a sufficient amplitude to be capable of catching the oscillator. From the moment when the oscillator gets out of synchronization up to the moment of catching, the television image displayed is left without any control and this must be regarded as undesirable.

In the circuit arrangement described in German patent specification No. 965,500, the element which must transmit the line synchronizing pulses in a state of non-synchronization is completely blocked in a state of synchronization by means of a voltage derived from the line phase discriminator. In this circuit arrangement also the blocking voltage is smoothed with the aid of a filter so that herein it also takes some time before the said element, after a state of non-synchronization has arisen, can transmit the line synchronizing pulses with an amplitude which is great enough.

This disadvantage is obviated in a circuit arrangement according to the invention. For this purpose the invention is characterized in that to a first electrode of an element included in the catching circuit is supplied a synchronizing pulse with a polarity which releases this element, while to a second electrode is applied either a pulsatory voltage delivered by the local oscillator, or a pulsatory voltage derived from the signal of the oscillator, which voltage during each cycle has a part of short duration which blocks the said element and a part of long duration which releases the element, the arrangement being such that in a state of synchronization the said part of short duration and the synchronizing pulse coincide, so that the element in the catching circuit is continuously blocked in the state of synchronization and released in the state of non-synchronization when the synchonizing signal and the said part of long duration coincide.

Since in a circuit arrangement according to the invention the blocking voltage applied to the second electrode of the element in the catching circuit is derived from the oscillator itself, or from a signal delivered by the oscillator, this element may be released immediately or almost immediately after a state of non-synchronization has occurred.

In order that the invention may be readily carried into effect, several embodiments thereof will now be described in detail, by way of example, with reference to the accompanying diagrammatic drawings, in which.

Figures 7, 8:
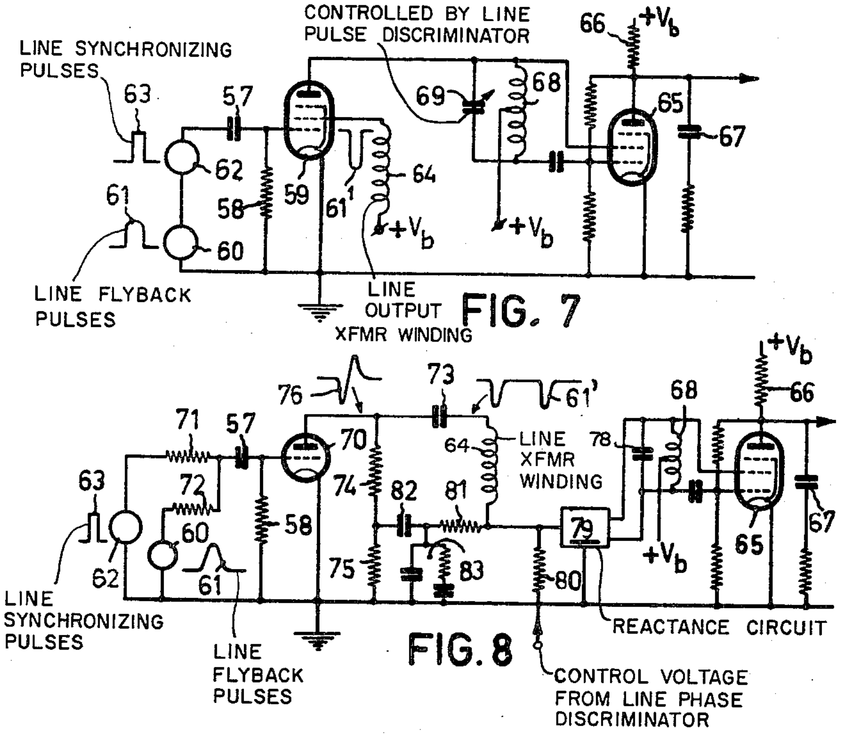
FIGURE 7 shows an embodiment for synchronizing a line oscillator.

FIGURE 8 likewise shows a circuit arrangement for synchronizing a line oscillator, but in which the element in the catching circuit is formed as an auxiliary phase discriminator.

Figure 1:
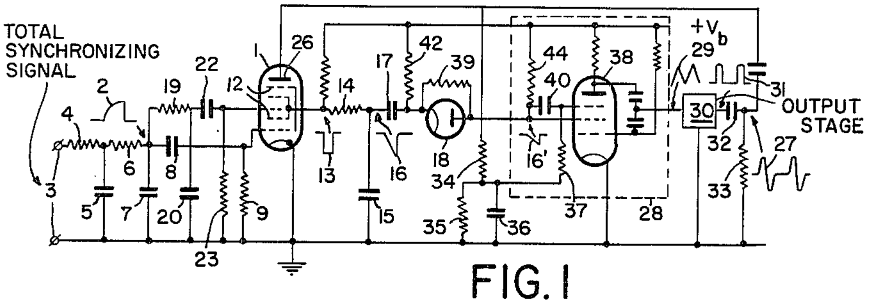
FIGURE 1 illustrates a first embodiment of a circuit for synchronizing a raster oscillator, in which the element in the catching circuit is a diode.

Referring now to FIGURE 1, a multi-grid tube 1 fulfils the functions of both an amplifier for the raster synchronizing pulses and a raster phase discriminator. For this purpose raster synchronizing pulses 2, derived by integration from the total synchronizing signals applied to input terminals 3, are applied to the first control grid of tube 1. The signal applied to the terminals 3 is integrated twice by means of integrating networks comprising a resistor 4 and a capacitor 5, and a resistor 6 and capacitor 7 respectively. The signal 2 resulting from this integration is applied through a grid capacitor 8 and a leak resistor 9 to the first control gride of tube 1.

Figure 2:
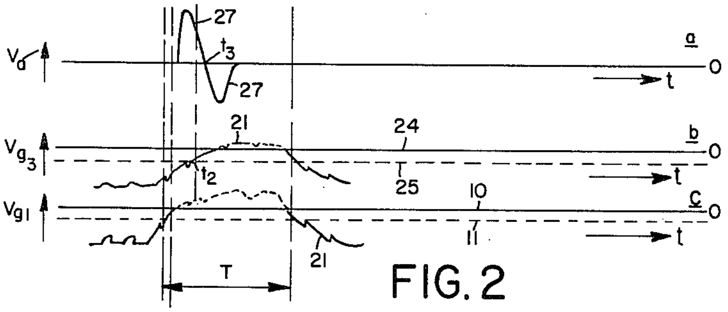
FIGURES 2 and 3 illustrate curves which serve to clarify the arrangement of FIGURE 1.

The peak of the signal 2, as indicated by a broken line in FIGURE 2*c*, is flattened due to the flow of grid current. A line 10 in FIGURE 2*c* represents earth potential and a line 11 corresponds to the cut off voltage at the first control grid of tube 1. Consequently, during the occurrence of a synchronizing pulse current can flow through the tube 1 only during the period T indicated in FIGURE 2*c*. From this it follows that the synchronizing pulses produce more or less pulsatory flow of current in the tube, resulting in a pulsatory voltage 13 at the screen grid 12 of tube 1. The pulsatory voltage 13 is integrated again by means of a further integrating network comprising a resistor 14 and a capacitor 15. A pulse 16 resulting from this integration is supplied through a coupling capacitor 17 to the cathode of a "transmitting element" or electronic gate tube 18.

This transmitting element is the element in the catching circuit which, in a state of non-synchronization, must transmit the negative-going synchronizing pulses 16 with a maximum amplitude. Before explaining the operation of the transmitting element 18, a brief description of the operation of the phase discriminator portion of tube 1 will be given.

The phase discriminator comprises the portion of the multigrid tube 1 which, as viewed from the cathode to the anode, is located beyond the screen grid 12.

To ensure satisfactory operation of the phase discriminator portion, the signal 2 is integrated for the third time by means of an integrating network comprising a resistor 19 and a capacitor 20. The signal resulting from this third integration is represented by a curve 21 in FIGURE 2*b*. The signal 21 is supplied through a grid capacitor 22 and a leak resistor 23 to the third grid of tube 1. In this case also the crest of the signal, represented by curve 21, is flattened by grid-current limitation and therefore indicated by a broken line in FIGURE 2*b*. In this figure a line 24 represents earth potential and a line 25 the level of the cut off voltage at the third grid.

By carrying out the third integration, the signal 21 is delayed with respect to the signal applied to the first control grid. Thus, upon occurrence of a synchronizing pulse, the current to the screen grid 12 can start flowing from the moment $t_1$ and current to the anode 26 cannot start until the moment $t_2$.

The desired operation of the tube 1 as a phase discriminator is obtained by supplying to the anode 26 a signal 27 which is derived from a sawtooth signal 29 delivered by a sawtooth oscillator 28. The signal 29 is supplied to an output stage 30 which delivers a sawtooth current through the vertical deflection coils (not shown) which deflect the electron beam in a display tube (likewise not shown) in a vertical direction. A signal 31, which is more or less pulsatory, is set up across the vertical deflection coils. The signal 31 is differentiated by means of a differentiating network comprising a capacitor 32 and a resistor 33. The signal 27 resulting from this differentiation is shown in FIGURE 2*a*. Only the positive-going peak of the signal 27 can cause anode current flow and anode current will flow only if the moment $t_3$ (end of the positive-going peak) comes after the moment $t_2$.

As described in the aforementioned U.S. Patent No. 3,070,753, the signal 21, shown in FIGURE 2*b*, is displaced more to the left relative to the signal 27, shown in FIGURE 2*a*, as the difference between the frequency of the raster synchronizing signal and the natural frequency of the oscillator increases. The time during which current can flow to the anode 26 is thus increased, so that the negative voltage which may be derived from the anode 26 is increased. This negative voltage is smoothed by means of a network comprising resistors 34, 35 and a capacitor 36. The time constant of the parallel combination of resistor 35 and capacitor 36 is very great and amounts to about 1 second.

The negative control voltage thus obtained is applied through a resistor 37 to the suppressor grid of a pentode tube 38 which is connected as a Miller-transitron oscillator.

If frequency difference between the synchronizing signal and the oscillator signal increases, a higher negative direct voltage is set up at the suppressor grid of the tube 38, so that the oscillator is controlled towards the frequency of the synchronizing signal.

The frequencies of the oscillator signal and of the synchronizing signal are made exactly equal to each other in this circuit arrangement by means of direct synchronization. For this purpose use is made of a signal 16' which is derived from the signal 16 by attenuation.

For good understanding of the operation of the total circuit arrangement, it is necessary to distinguish between two states.

Firstly a state of synchronization in which, in a manner which will be described hereinafter, the element 18 is blocked and the synchronizing pulses 16 are attenuated by a resistor 39 to form the synchronizing pulses 16'. The pulses 16' are applied to the suppressor grid of tube 38 by way of a capacitor 40 and in this state of synchronization bring about the direct synchronization. Since the pulses 16' have a comparatively small amplitude, they can keep the frequency of the oscillator signal equal to that of the synchronizing signal only if a sufficiently high negative voltage is developed across the network 35, 36. This negative voltage makes the frequency of the oscillator substantially equal to that of the synchronizing signal.

Secondly a state of non-synchronization in which the element 18 is released and the synchronizing pulses 16 are transmitted to the suppressor grid of tube 38 with a much greater amplitude than through the resistor 39.

To explain the blocking and release of the transmitting element 18, which is formed as a diode, FIGURES 3*a* and 3*b* show voltage $V_{Dk}$ (the voltage at the cathode of diode 18), and voltage $V_{Da}$ (the voltage at the anode thereof, in the correct relationship to each other as to voltage and time for a state of synchronization. In such a state of synchronization the phase discriminator, together with the attenuated synchronizing pulses 16', brings about a phase difference $\Delta\phi$ between the synchronizing and oscillator signals, which is comparatively small, but differs from zero. If one or more synchronizing pulses drop out, the frequency of the oscillator signal differs from that of the synchronizing signal, but this difference will be small only due to the high voltage across the network 35, 36. If, however, synchronizing pulses 16' of great amplitude were used, then upon disappearance of one or more synchronizing pulses the said difference would be much greater and the use of a phase discriminator would be impractical.

For satisfactory operation of the whole it is desirable in a state of synchronization to hold $\Delta\varphi$ between $\frac{1}{3}\varphi$ and $\frac{1}{4}\varphi$, wherein $\varphi$ is the maximum phase difference possible between the synchronizing signal and the oscillator signal. If this cannot be achieved by means of the phase discriminator and the attenuated synchronizing pulses 16 alone, a separate direct voltage may be applied, if necessary, to the suppressor grid of tube 38, which voltage may be derived from the line phase discriminator.

Figure 3:
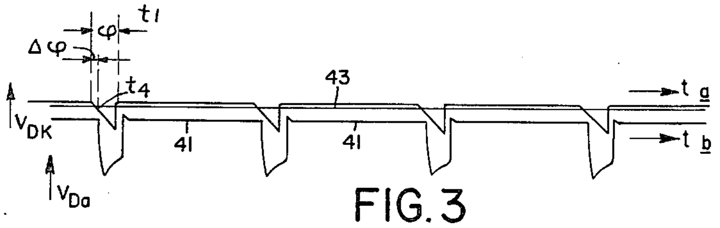

In such a state of synchronization, the phase position of the voltage at the screen grid of tube 38 relative to the synchronizing pulses 16 is therefore as shown in FIGURE 3, since the anode of diode 18 is connected directly to the screen grid of tube 38, so that the signal at this screen grid is the same as the signal $V_{Da}$ shown in FIGURE 3*b*. The beginning of the fly-back of the sawtooth signal 29 is initiated at the moment $t_4$, so that from this moment the screen-grid current increases and the screen-grid voltage decreases. Consequently, the voltage $V_{Da}$ at the anode of diode 18 also decreases and this diode remains cutoff, even though the cathode voltage $V_{Dk}$ then decreases below the level indicated by a line 41.

The diode 18 acquires the desired bias potential through a resistor 42 which connects its cathode to the positive supply voltage $V_b$. The bias level thus obtained is represented by a line 43.

Since the ohmic value of a resistor 44 included in the screen-grid conductor of tube 38, together with the screen-grid current, substantially determines the level indicated by the line 41, it can always be ensured that for the maximum possible $\Delta\varphi$ in a state of synchronization the diode 18 remains blocked and only the attenuated synchronizing pulses 16' bring about the direct synchronization.

If, however, a state of non-synchronization arises, the phase position of the synchronizing pulses relative to the oscillator signal is arbitrary, so that the cathode voltage $V_{Dk}$ sometimes decreases below the level represented by the line 41 between two pulses of the screen-grid voltage. Thus, the diode 18 is released and the pulses 16 can be transmitted with the desired great amplitude. Consequently, in a state of non-synchronization, a synchronizing pulse of sufficiently great amplitude is supplied to the oscillator without delay and this pulse immediately brings about synchronization.

This being effected, the voltage across the network 35, 36 need not necessarily have reached the correct value because of the high time constant of this network. (Imagine, for example, a state in which the television receiver is switched on and the capacitor 36 has not yet become charged.) The attenuated synchronizing pulses 16′ therefore cannot take over the direct synchronization at this time. The correct phase relationship $\Delta\varphi$ is not yet established and the diode 18 remains conductive. The synchronization is thus maintained and the phase discriminator has time enough to build up the desired voltage across the network 35, 36. Then this voltage is so high that the pulses 16′ can exert their influence, the phase difference between the synchronizing signal and the oscillator signal is gradually controlled back to a value $\Delta\varphi$ such that the diode 18 is blocked again.

Figure 4:
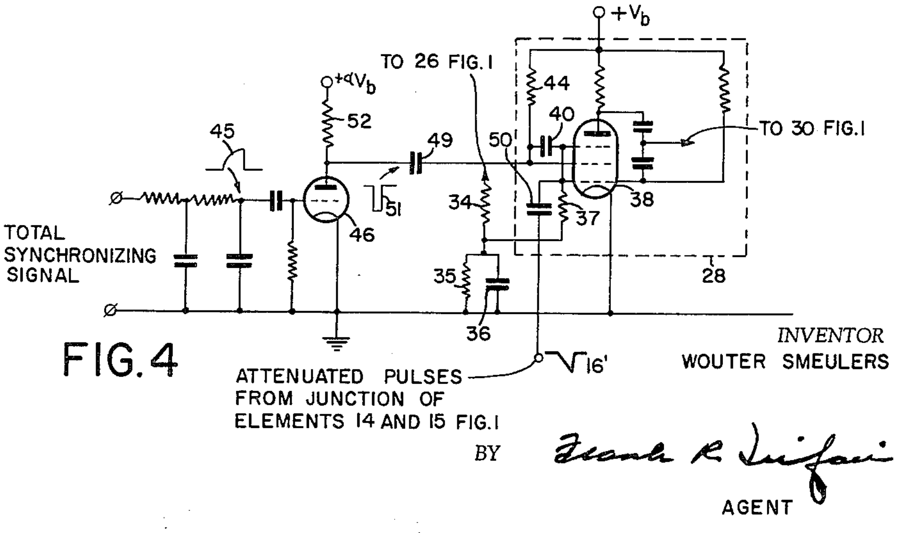
FIGURE 4 illustrates a second embodiment of a circuit for synchronizing a raster oscillator, in which the element in the catching circuit is a triode.

In the embodiment shown in FIGURE 4, the element in the catching circuit is formed as a triode. In this figure, the integrated raster-synchronizing pulses 45 are supplied with positive polarity through grid capacitor and leak resistor to the control grid of the element formed as a triode 46. The peak of the signal 45 is flattened by limitation of the grid current, so that the control-grid voltage of triode 46 has the shape shown in FIGURE 5*b*. In this figure, a line 47 represents earth potential and a line 48 the cut off voltage for the control grid of triode 46.

Figure 5:
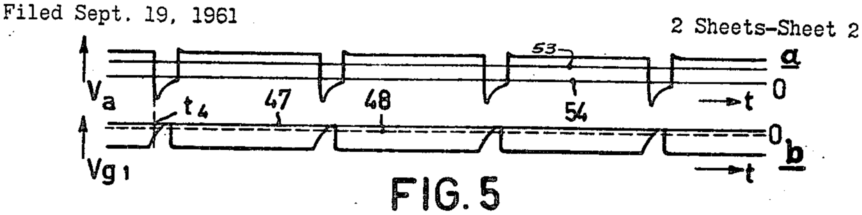
FIGURE 5 illustrates curves which serve to clarify the arrangement of FIGURE 4.

The anode of triode 46 is connected through a coupling capacitor 49 to the screen grid of tube 38. Due to this coupling capacitor, the screen-grid voltage shown in FIGURE 5*a* is applied to the anode of triode 46. The situation shown in FIGURE 5 corresponds to a state of synchronization. In such a state, the fly-back of the sawtooth signal 29 is initiated at the moment $t_4$ and at this moment the control-grid voltage is still below the level indicated by the line 48. The triode 46 is thus blocked by the control-grid voltage until after the moment $t_4$, but is blocked from the moment $t_4$ by the anode voltage which decreases to a value such that anode current does not flow, even though the control-grid voltage exceeds the level of the line 48. When the anode voltage increases again, the control-grid voltage has in the meantime decreased below the level indicated by the line 48, so that in a state of synchronization the triode 46 remains blocked during the occurrence of the synchronizing pulses and these pulses cannot therefore be transmitted. To permit nevertheless direct synchronization, the attenuated synchronizing pulses 16′ are supplied separately to the suppressor grid of tube 38 through a coupling capacitor 50.

In a state of non-synchronization, however, the control-grid voltage exceeds the level of the line 48 at moments when the anode voltage is a maximum. This results in a pulsatory anode current which brings about a pulsatory voltage 51 which is applied as a synchronizing pulse of great amplitude through the capacitor 49 to the screen grid and also through the capacitor 40 to the suppressor grid of tube 38. In this case also the synchronization, after the disappearance thereof, is thus established again without delay and is maintained until the voltage across the filter 35, 36 has increased so far that the pulses 16′ can take over the direct synchronization. Consequently, in a similar manner as in the preceding embodiment, the phase difference $\Delta\varphi$ is reduced to a value such that the triode 46 is again blocked continuously.

To ensure that the triode 46 is actually blocked during the time in which the control-grid voltage exceeds the level 48 indicated in FIGURE 5*b*, the anode is connected through an anode resistor 52 to a comparatively low supply voltage $\alpha V_b$. The level of the voltage $\alpha V_b$ is indicated by a line 53 in FIGURE 5*a*. This level may, for example, be so low that the anode voltage during the negative-going pulses decreases even below the earth potential indicated by a line 54, so that it is ensured under any conditions, apart from interference, that the triode 46 remains cut off in a state of synchronization.

If, however, interference should occur between two raster synchronizing pulses and such interference would have a great amplitude such as to exceed the level indicated by the line 48, it might give rise to anode current, which has an undesirable effect upon synchronization.

Now, the possibility of such interference coming through is small. First, the separated synchronizing signal is integrated so that interference pulses, which are usually of short duration, are attenuated so as to be incapable of exceeding the level of the line 48. Secondly, the majority of modern television receivers are provided with anti-interference circuits which remove interference from the incoming signal. Consequently, the possibility of interference penetrating to the control grid of triode 46 does not substantially exist.

If, however, an anti-interference circuit is not incorporated, it may be desirable to take steps in a state of synchronization to prevent interference pulses of long duration and great amplitude from disturbing the synchronization.

Figure 6:
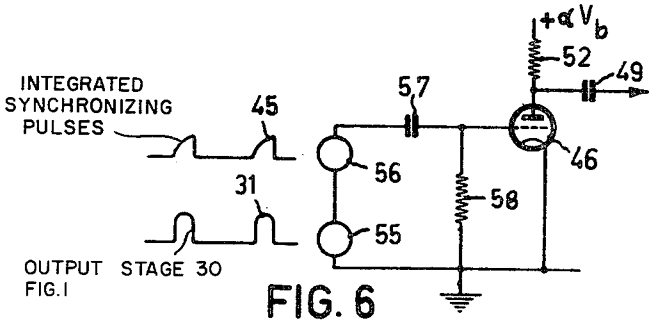
FIGURE 6 shows an arrangement of the element in the catching circuit, formed as a triode, which is a little different from that in FIGURE 4.

In order to achieve this, the synchronizing signal 45 of FIGURE 4 may be added to the signal 31 of FIGURE 1. This is shown in FIGURE 6, in which a source 55 delivers the signal 31 and a source 56 the synchronizing signal 45. The pulses of both signals are positive-going.

In a state of synchronization there is concidence between the signals 31 and 45 so that the sum thereof is applied through a grid capacitor 57 and a leak resistor 58 to the control grid of the triode 46. A capacitor 57 is negatively charged by grid current so that the sum signal controls the tube 46 in exactly the same way as was the case in the circuit of FIGURE 4.

However, if any interference pulses occurring between the raster synchronizing pulses would penetrate above the level of the line 48, they require amplitudes substantially equal to the sum of the amplitudes of the signals 31 and 45. However, since the stage separating the synchronizing signals passes only signals having amplitudes equal to, or at most a little greater than, that of the synchronizing signal, this is almost impossible. To ensure that the circuit arrangement continues to operate satisfactorily in a state of non-synchronization, it is necessary to fulfill two conditions. Firstly it is necessary (at least if operation substantially without delay is desired) that the time constant of the network 57, 58 shall be very low, for example equal to two or three cycles of the synchronizing signal, so that the charge of the capacitor 57 is removed almost immediately after a state of non-synchronization has arisen. Secondly the amplitude of the signal 45 must be greater than that of the signal 31, so that the pulses 45 only can bring about anode current and thus re-establish synchronization when the charge of the capacitor 57 has disappeared in a state of non-synchronization.

From the foregoing it follows that the direct synchronization by the pulses of great amplitude is now no longer taken over without delay. However, the time constant of the network 57, 58 may be chosen many times lower than that of the smoothing filter mentioned in the preamble, which flattens the attenuating voltage for the raster synchronizing pulses. In fact, a great voltage ripple at the control grid of tube 46 of FIGURE 6 is not troublesome, provided that the voltage does not drop to an extent such that interference pulses between two synchronizing pulses can bring about anode current. Consequently, catching with the aid of the circuit shown in FIGURE 6 may be effected much more rapidly than with the one in which the raster synchronizing pulses are attenuated in a state of synchronization.

It will be evident that the above-mentioned principle of blocking the element in the catching circuit is possible not only for the raster synchronization, but also for the line synchronization.

The line oscillator may then be formed as an astable multivibrator which is normally synchronized with the aid of a line phase discriminator. In a state of non-synchronization, negative line synchronizing pulses may then be applied for direct synchronization to a control grid of one of the two multivibrator tubes. This must be the control grid of that multivibrator tube which conveys current during the fly-time and which is cut off during the fly-back time of the saw-tooth current through the horizontal deflection coils.

In order to achieve this, use may be made of a circuit similar to that shown in FIGURE 6. The anode of triode 46 must then be coupled through the coupling capacitor 49 to the control grid of the multivibrator tube just referred to. This control grid is also coupled through a further capacitor to the anode of the other multivibrator tube which conveys current during the fly-back time of the line sawtooth current and at the anode of which a negative-going pulsatory voltage is then set up.

In this case the source 56 delivers the line synchronizing signal the pulses of which have a duration shorter than that of the line fly-back pulses delivered by the source 55.

The line synchronizing pulses and the line fly-back pulses coincide in a state of synchronization. The crests of this sum signal only come to lie in the grid space of tube 46 due to grid-current detection. However, the anode current is blocked during this time by the said negative-going pulses from the anode of the other multivibrator tube which reach the anode of triode 46 through the two capacitors.

The same phenomenon as with a raster oscillator occurs in a state of non-synchonization and the line oscillator is synchronized immediately.

Summation is in this case absolutely necessary, since otherwise noise and a single very thin interference pulse which cannot be suppressed by an anti-interference circuit might take along the line oscillator in an undesirable manner. However, in this case also, the time constant of the network 57, 58 may be equal to two or three cycles of the line synchronizing signal, so that catching of the synchronization, after it has disappeared, may be effected almost immediately. At any rate such catching takes place much more rapidly than would be the case if a voltage derived from smoothing filter must first leak away, as in German patent specification No. 965,500.

A possibility which utilizes a sine oscillator as the line ocsillator instead of a sawtooth oscillator is shown in FIGURE 7. A pentode 59 instead of a triode is now used as the element in the catching circuit. The sum of a positive line fly-back pulse 61, delivered by a source 60, and a positive line synchronizing pulse 63, delivered by a source 62, is applied to the control grid of tube 59. This sum is applied via grid capacitor 57 and leak resistor 58 to the control grid of tube 59 in a similar manner as in FIGURE 6.

The screen grid of tube 59 is connected via a winding 64 to the positive terminal of the supply voltage source. The winding 64 forms part of the line output transformer and its winding sense is chosen so that a pulse 61' which occurs during the fly-back of the line sawtooth signal renders the screen grid so negative relative to the supply voltage that anode current cannot flow.

The anode of tube 59 is connected to the screen grid of a pentode 65. This tube 65, which is included as a Hartley-oscillator between the screen grid and the control grid, delivers a sinusoidal voltage which, together with grid-current and anode-current limitation, yields a pulsatory anode current which, after having been integrated with the aid of a resistor 66 and a capacitor 67, results in a control voltage, more or less sawtooth-shaped, for the line output tube. The anode circuit of the line output tube includes the line output transformer of which the winding 64 forms part.

The frequency of the sine oscillator is determined by the tuned circuit included between the control grid and screen grid of tube 65 and comprising a tapped inductance 68 and a variable capacitor 69. The capacitor 69 is actually formed by the parallel combination of a fixed capacitor and a reactance circuit, the latter being controlled by a control voltage derived from an ordinary phase discriminator.

The oscillator 65 may thus be synchronized by means of this phase discriminator and the reactance circuit. This circuit thus likewise has a state of non-synchronization and a state of synchronization. In the latter state, the pulses 61, 63 and 61' coincide so that the tube 59 is continuously blocked.

In a state of non-synchronization, the pulses 61 and 61' coincide, but the pulses 63 occur somewhere between two pulses 61 and 61'. The capacitor 57 discharges very rapidly (this discharge lasts from two to three cycles of the line synchronizing signal) whereafter anode current produced by the pulses 63 can flow again. A negative synchronizing pulse is thus produced which immediately synchronizes the sine oscillator.

A further possibility is shown in FIGURE 8. In this figure the pentode 59 is replaced by a triode 70. The sum of the pulses 61 and 63 is applied to the control grid of tube 70, the summation being effected by means of adding resistors 71 and 72. In this circuit arrangement the winding 64 is connected, at one end, through a differentiating network comprising a capacitor 73 and resistors 74 and 75 to the anode of the triode 70 and, at its other end, connected to earth. A differentiated signal 76 is set up at the anode of tube 70. Since the pulses 61' are correlated to the pulses 61, the negative portions of the differentiated signal 76 coincide with the pulses 61.

FIGURE 8 shows the variable capacitor 69 of FIGURE 7 in greater detail and comprises a fixed capacitor 78 and a reactance circuit 79. The control voltage from the ordinary line phase discriminator is applied to the reactance circuit through a resistor 80. The reactance circuit 79 is also connected through a resistor 81 and a capacitor 82 to the common point of the resistors 74 and 75.

In a state of synchronization, the pulses 61, 63 and the negative portions of the signal 76 coincide. The tube 70 is thus continuously blocked.

In a state of non-synchronization, the tube 70 conveys current (after discharge of the capacitor 57) whenever the line synchronizing pulses 63 coincide with a positive portion of the signal 76. This results in a beat signal which is the envelope of the current pulses produced in this state of non-synchronization by the synchronizing pulse 63 in co-action with the positive portion of the signal 76. These current pulses are integrated by a network 83 whereby the envelope is determined. By choosing the time constant of the network 83 to be comparatively low for example equal to a few cycles of the highest possible beat frequency, the beat frequency is determined, but hardly attenuated.

The resulting beat signal is added through the capacitor 82 and the resistor 81 to the beat signal derived through resistor 80 from the ordinary phase discriminator. This total beat signal reaches the reactance circuit 79 and provides for catching the oscillator.

The resistors 74 and 75 are chosen so that the total beat signal has an amplitude great enough to realize the desired catching range.

The direct influence of the signal 76 upon the reactance circuit is small. Its frequency is much higher than the frequency of the highest possible beat signal, so that the signal 76 itself is attenuated by the network 83.

In conclusion, it is to be noted that the capacitor 82 is not absolutely necessary. The beat signal contains a direct voltage component which has the correct polarity for a frequency deviation to one side and the wrong polarity for a frequency deviation to the other side. Consequently, in the absence of capacitor 81, the said direct-voltage component slightly increases the catching range to one side and slightly decreases it to the other side.

It will be evident that, instead of using diodes or triodes, other elements, for example transistors, may be employed as the element in the catching circuit.

What is claimed is:

1. An oscillator frequency control system comprising, an oscillator circuit having a pulsatory output voltage and a frequency control input, a source of pulsatory synchronizing signals, a current control device having at least first and second electrodes, means connecting said second electrode to a bias voltage source, means applying said synchronizing signals to said first electrode with a polarity with respect to said bias source which tends to make said device conductive, means applying said pulsatory output voltage to said second electrode whereby the polarity of the pulses of said pulsatory output voltage block said device, whereby said synchronizing signals are passed by said device only when said synchronizing signals and pulses do not coincide, and means connecting the second electrode of said current control device to said oscillator circuit frequency control input for direct synchronization thereof, whereby said synchronizing pulses are applied to said oscillator circuit only when said oscillator circuit is out of synchronization with said signals.

2. An oscillator frequency control system comprising an oscillator circuit having a pulsatory output voltage and a frequency control input, a source of pulsatory synchronizing signals, a unidirectional current control device having at least first and second electrodes, means connecting said second electrode to a bias voltage source, means applying said synchronizing signals to said first electrode with a polarity with respect to said bias source which tends to make said device conductive, means applying said pulsatory output voltage to said second electrode whereby the polarity of pulses of said pulsatory voltage block said device, whereby said synchronizing signals are passed by said device only when said synchronizing signals and pulses do not coincide, means connecting the second electrode of said current control device to said oscillator frequency control input for direct synchronization thereof, means providing a control voltage having an amplitude dependent upon the phase difference between said synchronizing signal and the oscillations of said oscillator circuit, and means for applying said control voltage to said oscillator circuit frequency control input for controlling the frequency thereof.

3. The system of claim 2, comprising means for attenuating a portion of said synchronizing signals, and means for applying said attenuated signals to said oscillator circuit frequency control input whereby attenuated synchronizing signals are applied to said oscillator circuit in a state of synchronism.

4. The system of claim 3, in which said device is a rectifier device, said means for attenuating comprising resistor means connected in parallel with said rectifier device.

5. The system of claim 2, comprising means for applying said pulsatory voltage to said first electrode with a polarity tending to make said device conductive, said last-mentioned means comprising means for adding said pulsatory voltage and synchronizing signal, and time constant means having a time constant greater than the period of said synchronizing signal for applying said added signals to said first electrode.

6. The system of claim 2, in which said oscillator circuit comprises a Miller-transitron oscillator having an electron discharge device, said unidirectional current device is a rectifier device, and said means applying said pulsatory voltage to said second electrode and means connecting said device to said oscillator circuit comprise means connecting said second electrode to said electron discharge device.

7. The system of claim 2, in which said unidirectional current device is an electron discharge device having at least control grid, screen grid, cathode and anode electrodes, wherein said control grid electrode is said first electrode, said screen grid electrode is said second electrode, said cathode is connected to a source of reference potential, and said means connecting said device to said oscillator circuit comprises means connecting said anode electrode to said oscillator circuit.

8. An oscillator frequency control system comprising an oscillator circuit having a frequency control input and an output providing a pulsatory voltage, a source of pulsatory synchronizing signals, an electronic gate means having at least input and output electrodes, means applying said synchronizing signals to said input electrode with a polarity which tends to make said device conductive, means connecting said oscillator circuit output to said output electrode with a polarity which blocks said gate means and means for applying synchronizing pulses passed by said gate means to said oscillator circuit frequency control input for direct synchronization of said oscillator circuit whereby said synchronizing signal is applied to said oscillator circuit by way of said electronic gate means only when said oscillator circuit pulsatory voltage is out of synchronization with said synchronizing signals.

9. The circuit of claim 8, wherein said means applying said synchronizing signals to said input electrode comprises means for deriving a second pulsatory voltage from said first-mentioned pulsatory voltage, said second pulsatory voltage having a polarity tending to make said electronic gate means conductive, means for adding said synchronizing signal and second pulsatory voltage, and means for applying said added voltage and signal to said input electrode.

10. An oscillator frequency control system comprising an oscillator circuit having a frequency control input and an output providing a pulsatory voltage, a source of pulsatory synchronizing signals, and electronic gate means having at least first and second control electrodes and an output electrode, means applying said synchronizing signals to said first control electrode with a polarity which tends to make said device conductive, means for applying said pulsatory voltage to said second control electrode with a polarity which blocks said device, and means for connecting said output electrode to said oscillator circuit frequency control input for direct synchronization thereof whereby said oscillator circuit is directly synchronized by said synchronizing signals passed by said device only when said oscillator circuit is out of synchronization with said synchronizing signals.

11. The system of claim 10, in which said means applying said synchronizing signals to said first control electrode comprises means adding said synchronizing signals to a portion of said pulsatory voltage, said portion having a polarity tending to make said device conductive, and means applying said added voltage and signal to said first control electrode.

12. An oscillator frequency control system comprising an oscillator circuit having a frequency control input and an output providing a source of a pulsatory voltage, a source of synchronizing signals, an electronic gate means having at least an input electrode and an output electrode, means applying said synchronizing signals to said first input electrode with a polarity which tends to make said device conductive, differentiating means for applying said pulsatory voltage to said output electrode whereby the first portion of the differentiated signal tends to block said device and the second portion thereof tends to make said device conductive, a source of a control voltage having an amplitude dependent upon the relative phases of said synchronizing signal and the oscillations of said oscillator circuit, reactance circuit means connected to said oscillator circuit frequency control input for controlling the frequency thereof, means applying said control voltage to said reactance circuit means, and means connecting said output electrode to said reactance circuit means whereby the beat signal of said synchronizing signal and pulsatory voltage is applied to said reactance circuit means when said oscillator circuit is out of synchronization with said synchronizing signals.

References Cited by the Examiner

UNITED STATES PATENTS

| | | | |
|---|---|---|---|
| 2,838,673 | 6/58 | Fernsler et al. | 331—14 |
| 2,848,617 | 8/58 | Harowitz | 331—20 |

FOREIGN PATENTS

| | | |
|---|---|---|
| 220,074 | 10/58 | Australia. |

ROY LAKE, *Primary Examiner.*